May 23, 1967  L. G. OPEL  3,321,652
DYNAMO-ELECTRIC MACHINE
Filed Dec. 23, 1963  4 Sheets-Sheet 1

INVENTOR.
LAWRENCE G. OPEL
BY
*Charles F. Dischler*
ATTORNEY

May 23, 1967 L. G. OPEL 3,321,652
DYNAMO-ELECTRIC MACHINE
Filed Dec. 23, 1963 4 Sheets-Sheet 2

INVENTOR.
LAWRENCE G. OPEL
BY
Charles F. Dieckler
ATTORNEY

May 23, 1967 L. G. OPEL 3,321,652
DYNAMO-ELECTRIC MACHINE
Filed Dec. 23, 1963 4 Sheets-Sheet 3

INVENTOR.
LAWRENCE G. OPEL
BY
Charles F. Dischler
ATTORNEY

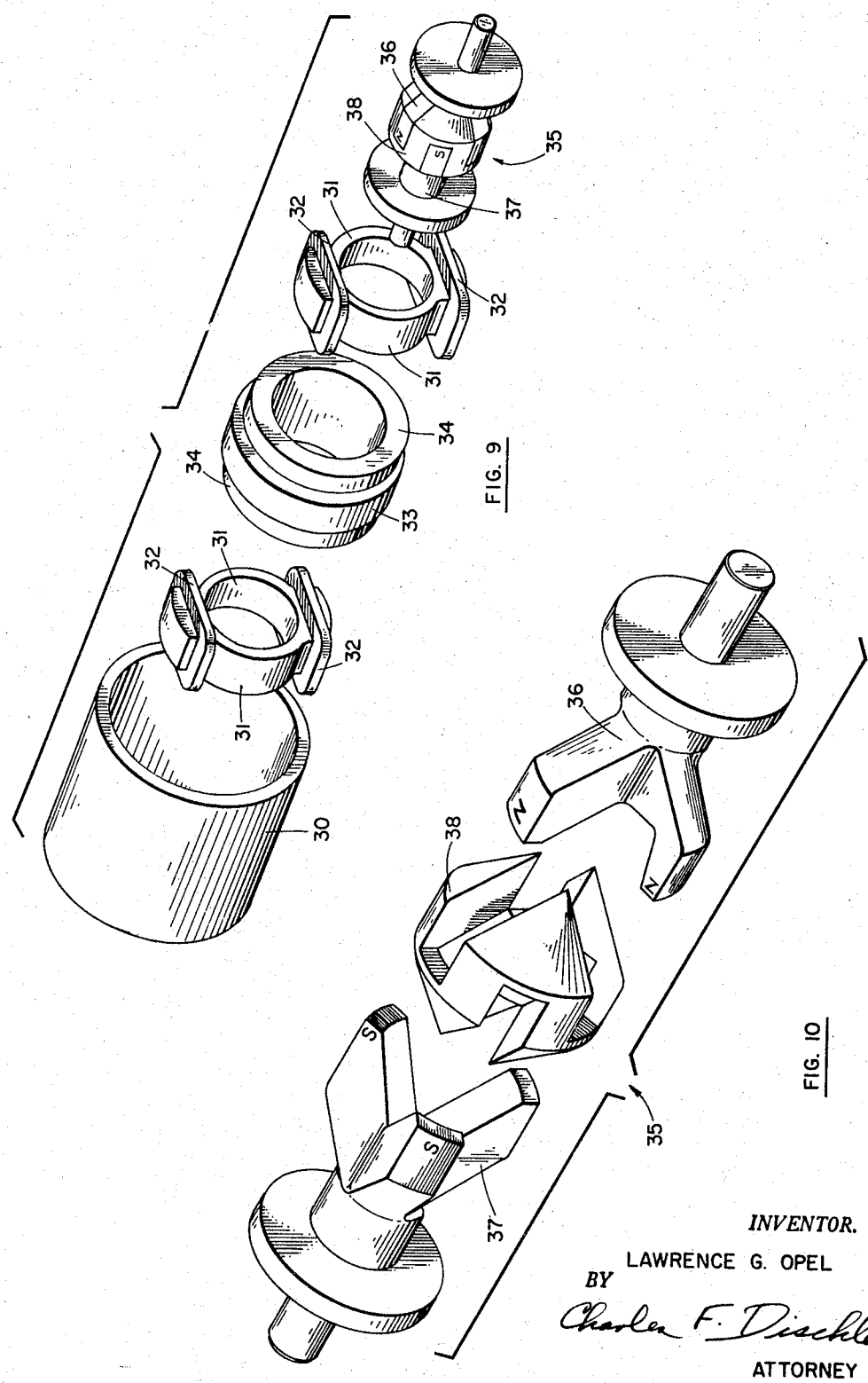

United States Patent Office 3,321,652
Patented May 23, 1967

3,321,652
DYNAMO-ELECTRIC MACHINE
Lawrence G. Opel, Pacific Palisades, Calif., assignor to North American Aviation, Inc.
Filed Dec. 23, 1963, Ser. No. 332,635
5 Claims. (Cl. 310—168)

This invention relates to a salient pole-type dynamo-electric machine with stationary field excitation and in particular it relates to a generator or alternator having a unique magnetic flux circuit that utilizes the machine iron structure and conductors to their maximum extent thereby permitting a reduction in the size, weight and cost of such machines for a given power output.

A primary object of this invention is to provide a brushless dynamo-electric machine having only static windings and having as its sole rotating part a solid cylindrical rotor, whereby its rotational speed is not limited by the mechanical stresses in conventional rotor windings, but wherein such speed is solely circumscribed by the strength of the unitary solid metal rotor structure and the mechanical features of design such as bearings and the like. A machine of this type is capable of direct coupling to a high speed prime mover, such as a turbine.

Another object of this invention is the provision of a synchronous machine having a continuous smooth surfaced rotor that is dynamically and magnetically balanced for any number of pole-pairs and which is thereby further adapted for extremely high rotational speeds. Another object of this invention is the provision of a dynamo-electric machine wherein the flux in the rotor and the reluctance of its magnetic circuit are essentially constant.

Still another object of the present invention is the provision of a solid rotor heteropolar dynamo-electric machine wherein optimum use and efficiency is made of the iron and conductor structure by means of the excitation magnetic flux circuit returning from the stator through a magnetic housing and thence back to the rotor. The flux enters and leaves the rotor through two annular circumferential rotating gaps with the stator voltage being induced by the flux reversing in polarity from north to south as the rotor is rotated past the stator conductors, as in a conventional salient pole generator.

A further object of the invention is to provide an excitation circuit that does not require magnetic isolation of the stator section from the housing and the excitation magnetic circuit, as required for some other types of static field generators.

A still further object of the invention is the provision of a magnetic circuit having a static D.C. excitation coil on each side of the stator whereby leakage flux is reduced to a minimum.

Again, another object of this invention is the provision of a high strength solid steel rotor comprising magnetic sections, each having a plurality of centrally positioned salient poles connected to a cylindrical end pole with such sections being magnetically isolated from each other by a non-magnetic steel member.

Yet another object of this invention is the provision of a salient pole rotor having adjacent poles of opposite north and south polarity, such poles being magnetically isolated from each other with non-magnetic material, such as air, brass, non-magnetic metals, ceramics, plastic or a combination of non-magnetic materials.

These and other objects and advantages of the present invention will become apparent to those skilled in the art after reading the present specification and the accompanying drawings forming a part thereof, in which:

FIG. 9 is an exploded perspective view of the machine of FIG. 8; and

FIG. 10 is an enlarged exploded perspective view of the rotor of the machine of FIGS. 8 and 9.

Prior art electric dynamo machines heretofore generally considered to be best suited for high speed, high temperature applications have included those homopolar designs known as the Inductor and Inductor-Lundell machines, as well as the Lundell heteropolar machine. The entire family of such designs is characterized by the generation of field flux in a stationary field coil mounted with the stator wherein the flux is transferred into the rotor across an annular air gap. The rotor is a rigid mass without windings or rotating rectifiers. In explaining the present invention, a simplified form of each of these types of machines is shown in FIGS. 1, 2 and 3 for purposes of comparison.

Figure 1:
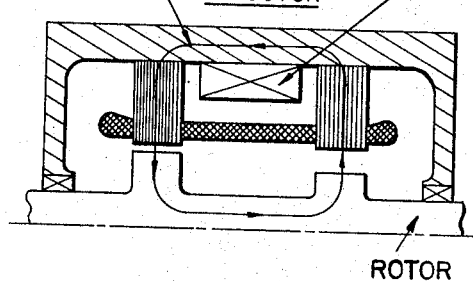
FIGS. 1, 2 and 3 are schematic representations of the Inductor, Lundell and Inductor-Lundell type machines, respectively.

The so-called Inductor machine of FIG. 1 comprises a double-ended homopolar design having the field excitation windings mounted on the stator in a central position between the two stator sections and radially outside of the stator conductors. This location increases the length of the stator conductor portion in which no voltage is being generated. Two stator sections are required in order to generate maximum power from a given air gap flux since one stator section uses only north pole flux and the other only south pole flux. The magnetic flux follows low reluctance paths through the outer shell of the housing into a radially extending stator pole, thence into the rotor body and back into the stator through a second pole at the opposite end of the machine. At each stator pole the flux alternates from essentially zero to full plus (north) or full minus (south), respectively. Voltage generation in the Inductor-type machine is obtained by rotating the shaft and thereby varying the reluctance of the flux path from the stator to the rotor. The stator conductors thus are exposed to a pulsating unidirectional flux. Since only half of the coductors in each stator section are producing voltage at any instant, the magnetic steel is utilized to only half of its capacity in either a positive or negative flux direction (but not both), and nearly twice as much magnetic material is thereby required. The longer parts result in increased weight and size, in addition to a low efficiency which is brought about by increased copper, windage and core losses. All three such losses are a direct result of the large stator and rotor.

Figure 2:
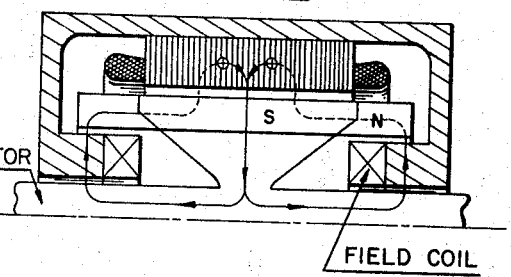

In the pure Lundell configuration of FIG. 2, (U.S. Patent No. 2,796,542) the magnetic flux flows in the rotor axially in two directions and across a double concentric gap at each end of the rotor. The flux circuit in the stator is from a rotor pole, across a radial air gap into the stator field coil iron and thence back into the next rotor pole of opposite polarity. This machine has advantages in some applications but, in general, is not considered too desirable because of high flux leakage and the high weight per kva. resulting therefrom. The high rotor leakage also has adverse effects on transient performance and voltage recovery times.

Figure 3:
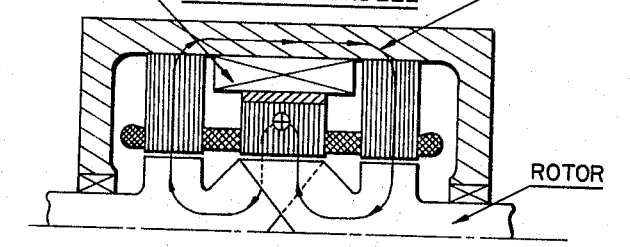

The Inductor-Lundell design combines the features of a pure Lundell and an Inductor machine, as can be seen from FIG. 3. This type of machine has an Inductor section at each end of the shaft and a Lundell section in the center. At each end of the rotor, voltage is induced in the stator conductor by a magnetic flux alternating from a given value to zero. The plus flux (north pole) is on one end and the minus flux (south pole) on the other end. At each end, the Inductor-Lundell configuration also utilizes only half of the capacity of the magnetic steel. However, in the Lundell section the voltage in the stator conductors is induced by flux alternating from plus (north) to minus (south) and the magnetic steel in this portion is utilized to its full capacity. However, the generator stator section is at a positive magnetic potential with respect to the surrounding iron parts and an axial flux passes across the stator iron. This positive magnetic potential requires the stator of the Inductor-Lundell generator to be magnetically insulated from the magnetic frame or housing and the magnetic end rings used to complete the path to the rotor ends, in order to reduce the amount of the axial flux flowing in the stator and producing no useful voltage.

The present invention combines the benefits of a lower speed synchronous machine, i.e., compactness, lightweight and reliability, with the advantages of an inductor machine, i.e., high speed, high temperature operation and long life. It achieves this function by the use of a unique excitation circuit, static conductor windings, and, in its preferred form, a solid smooth surfaced cylindrical rotor of high strength material which requires no coolant and which is inherently balanced both dynamically and magnetically for any number of pole pairs. Because of this balanced condition and the lack of any rotating windings, no speed limitations exist such as are found in the prior art machines described above. The rotational speed limit of this device is determined only by the allowable rotational stresses of the materials of construction of the rotor.

When used as a generator, the electro-dynamic machine of the present invention consists of a conventional synchronous generator stator wherein the iron and conductors are utilized 100%, a stationary direct current excitation field winding for producing a magnetic field for generating the output voltage with a magnetic circuit which includes a rotor, field poles, an annular gap at each field pole and a stator salient pole gap. By reason of its configuration and the arrangement of field excitation coils, the magnetic field circuit of the present invention results in minimum leakage fluxes since the stator iron is at substantially the same magnetic potential as the housing and field poles. The magnetomotive force generated by a north or south pole is only that required for a single salient pole air gap, while other types of generators require the magnetomotive force of a north or south pole to be that required for two such generator air gaps in series. Therefore, when compared to a synchronous machine the present invention results in a comparable stator but a longer magnetic flux path. However, compared to an inductor machine, the stator is shorter. As the windage loss is less, efficiencies may be higher than those of a conventional synchronous machine, while the machine is lighter and smaller than the prior art inductor-type machines.

Figure 4:
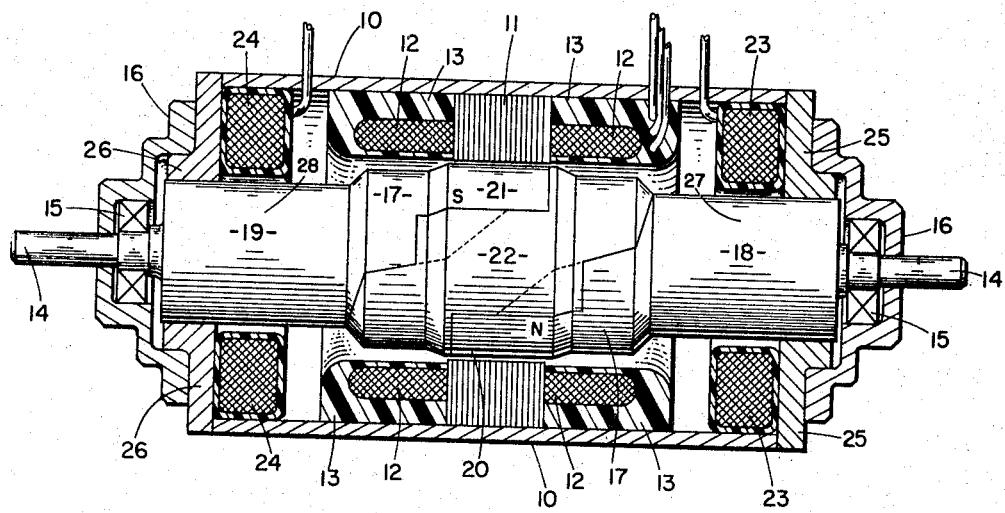
FIG. 4 is a longitudinal sectional view of the basic two-pole machine of the present invention.

A basic two-pole machine exemplifying the present invention is illustrated in FIG. 4, wherein housing 10 carries a laminated stator 11 of a conventional synchronous generator type having stator conductor windings 12 located in slots therein and suitably insulated as at 13. Unlike prior art machines, stator 11 is not magnetically insulated from housing 10 but is in direct contact therewith and both stator and housing are formed of high flux density magnetic iron or steel. This permits a reduction in the overall diameter of such a machine with a significant reduction in the amount and weight of material required.

A shaft 14 is supported at each end by ball bearings 15 seated in housing end bells 16. Formed integral with the shaft is a rotor 17 comprising a solid smooth-surfaced body of revolution having no surface voids, cavities or chambers and essentially comprising an enlarged machined section of the shaft. Despite its solid integral construction, the rotor has two salient poles of opposite polarity formed to rotate opposite stator 11. The rotor includes two magnetic end portions 18 and 19 having salient poles 20 and 21, respectively, separated by a non-magnetic center yoke section 22. Rotor poles 20 and 21 preferably have substantially constant arc width along their axial length to minimize leakag flux and provide maximum stator air gap working flux. Shaping the pole faces to have uniformity of cross section produces a uniform output voltage wave and insures equal utilization of the stator conductors. If desired however the rotor salient pole widths may be made non-parallel to provide wave shaping and to permit use of different methods of fabrication.

Field excitation is produced by means of fixed annular coils 23 and 24 mounted concentrically about rotor end portions 18 and 19 and adjacent to field poles 25 and 26, respectively. The arcuate faces of the field poles conform to and are closely adjacent to the rotor end poles 27 and 28 to provide a minimum annular air gap therebetween. The outer end of each field pole is in direct contact with one end of magnetic housing 10. The coils are so wound and so supplied with direct current that the fluxes produced in the rotor axially add to each other. One coil is used for each polarity and a single coil will excite the total number of poles used for each polarity.

The magnetic circuit of the generator stator section is identical to that of a conventional synchronous generator stator. Thus, a voltage is generated in the same manner as a conventional salient pole wound field generator generates voltage, i.e., a magnetic field of alternate north and south polarity is rotated mechanically past the generator conductors, thus generating a voltage in the stator conductors by causing a change in the flux linkages of the conductors as a function of time.

Figure 6:
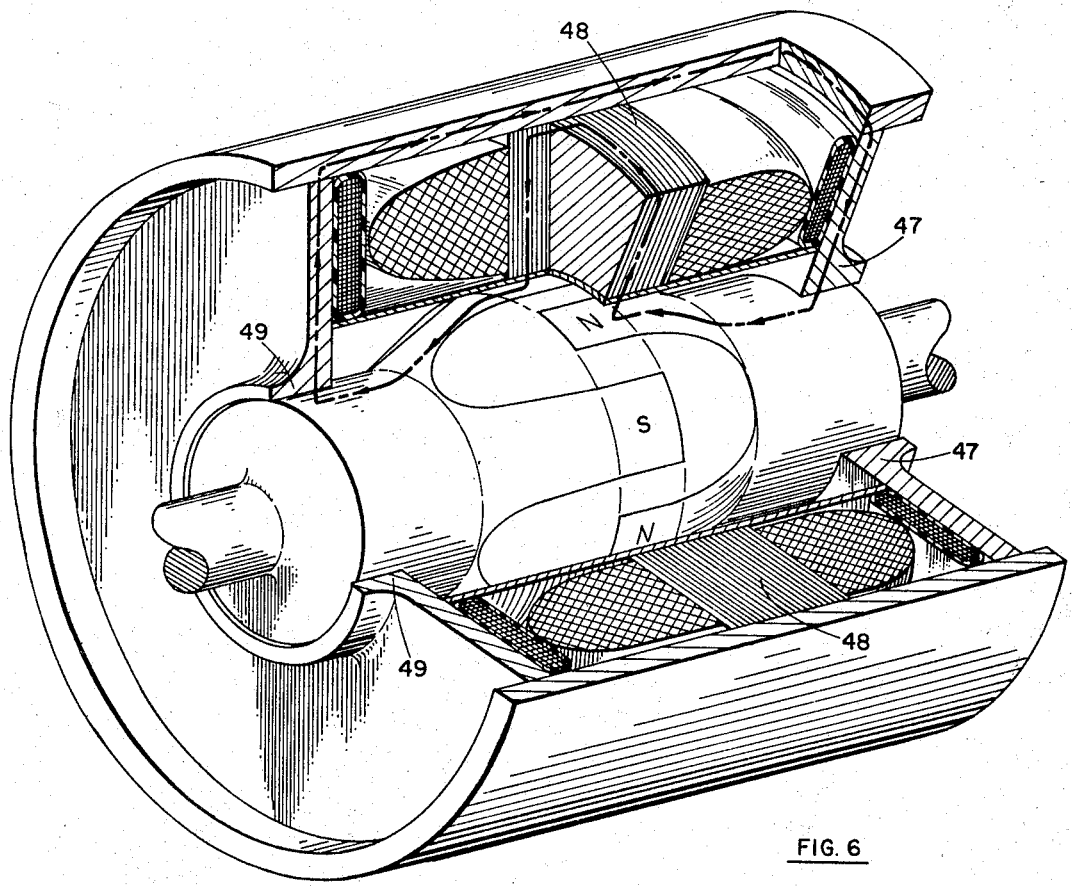
FIG. 6 is a partial sectional view of an eight-pole machine in accordance with the present invention illustrating the flux circuit during operation.

The excitation magnetic circuit of the present invention is best shown in FIG. 6 which illustrates an eight-pole embodiment of the present invention. As shown therein, starting from the concentric gap of the right hand field pole 47, the flux path is across the gap and then axially toward the center of the rotor. It divides equally between the number of like salient poles and then travels across the rotor salient pole gap to the stator yoke iron 48. In the stator iron, it has two possible return paths. The first such return path is through the stator yoke iron to the opposite polarity rotor salient poles, while the second such return path is directly from the stator iron through the magnetic housing back to the right hand field pole in a clockwise direction. Under conditions where such second flux return path would occur, a similar but counterclockwise flux circuit would result between the stator iron and the left hand field pole 49. While the actual flux path taken is not known or provable, it has been theorized, whether correctly or not, that during normal operation, with the rotor turning, the flux path with lowest reluctance possibly may be through the laminated stator yoke iron into the opposite polarity rotor pole since the housing iron, being non-laminated, offers higher reluctance to changing flux than the laminated stator iron. The flux then continues axially to the left end of the rotor, across the annular gap into the left hand field pole 49 and through the magnetic housing or frame back to the right hand field pole 47, completing its circuit in the pole at the concentric gap. It has been further theorized that the flux may follow the second flux return path, or more correctly flux return paths, when the shorter clockwise and counterclockwise flux circuits offer less reluctance to flux flow than that of the so-called first flux path. Under these latter conditions, the flux flows directly from the stator iron back to the individual field poles 47 and 49.

For some applications it may be desirable to replace the excitation coils with permanent magnet material in the rotor ends, the stationary field poles or the housing to provide the excitation power for the magnetic circuit.

Figure 7:
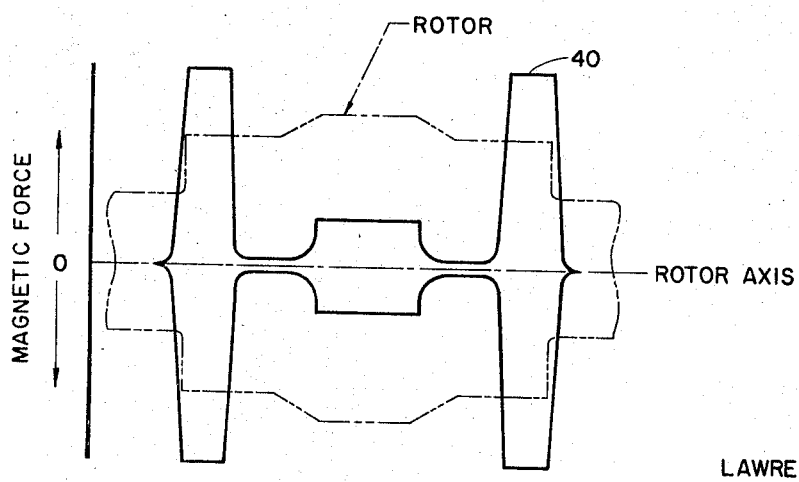
FIG. 7 is a magnetic force diagram for the eight-pole machine of FIG. 6 illustrating the balancing of the magnetic forces around the rotor.

The rotor flux rotates with the rotor and under steady state conditions is unidirectional and of constant magnitude. The frame and field pole flux, under steady state conditions, is also of fixed magnitude and constant direction. Flux transitions from rotating to non-rotating take place at the annular air gaps existing at the field poles. As the pole gaps are concentric around rotor end poles 27 and 28 of rotor end sections 18 and 19, respectively, of FIG. 4, the flux density is constant around the periphery of the rotor end poles and these poles do not see a varying flux under steady state conditions and consequently a power loss does not occur in the rotor at the field gap. Thus, it is an important characteristic of the present invention that the rotor is inherently balanced, both magnetically and dynamically, for any number of pole pairs. This is illustrated in FIG. 7, where the magnetic force diagram for the eight-pole rotor of FIG. 6 is shown at 40 superimposed on the rotor outline with the magnetic forces in any radial direction being balanced by equal and opposite forces around the circumference of the rotor thereby resulting in minimum bearing loads.

Figure 8:
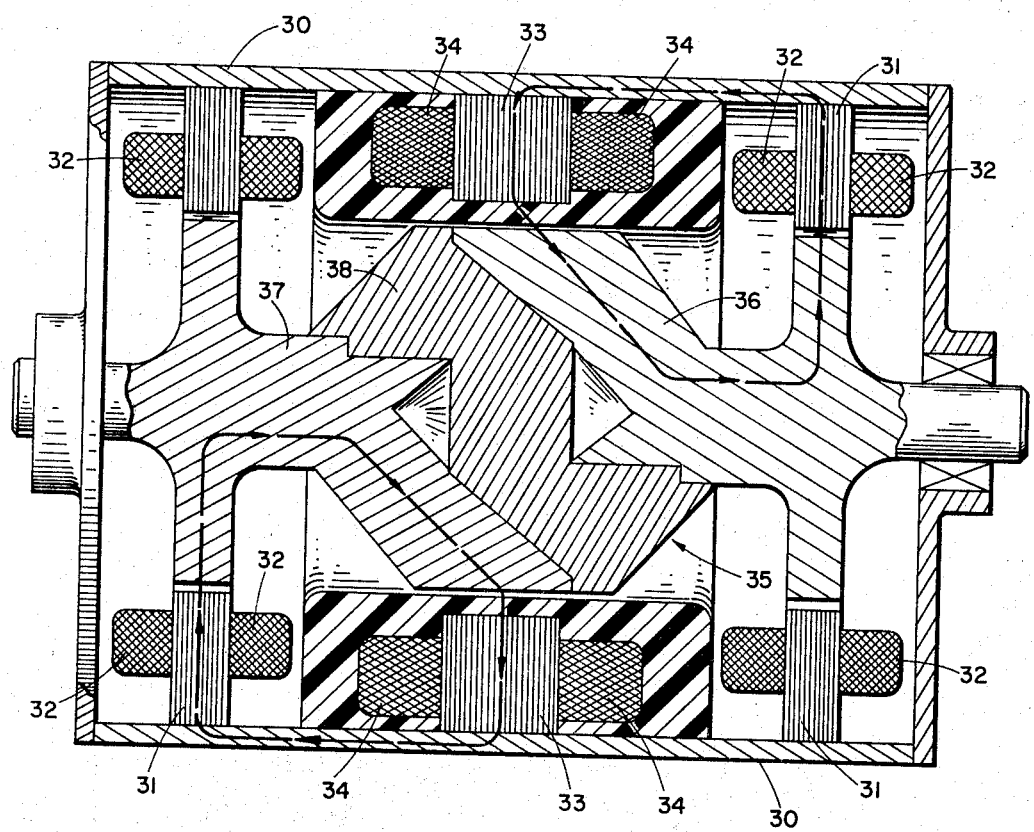
FIG. 8 is a longitudinal sectional view of a six-pole machine in accordance with the present invention.

FIGS. 8, 9 and 10 illustrate a six-pole machine, in accordance with the present invention, comprising a frame 30, a pair of oppositely disposed field poles 31 at each end of the machine with a field excitation coil 32 wound on each pole, stator 33 including stator current generating windings 34 and rotor 35. FIG. 10 is an exploded view of the two magnetic rotor sections 36 and 37, each forming three poles with one section having north poles and one section south poles, and the non-magnetic center yoke section 38. A suitable material for the pole sections is a low alloy steel such as AISI 4130, while the non-magnetic yoke may be of a nickel base alloy such as the International Nickel Company alloy designated Inconel Alloy 718.

After machining the three sections they are mechanically interlocked and joined metallurgically either by welding, furnace brazing, or the like. Following the brazing operation, the rotor is finish-machined, preferably to an aerodynamic surface smoothness of at least R.M.S. 125 (root mean square height in microinches), and then dynamically balanced. A protective finish may be applied to the rotor to prevent corrosion in a high temperature corrosive atmosphere operation.

Figure 5:
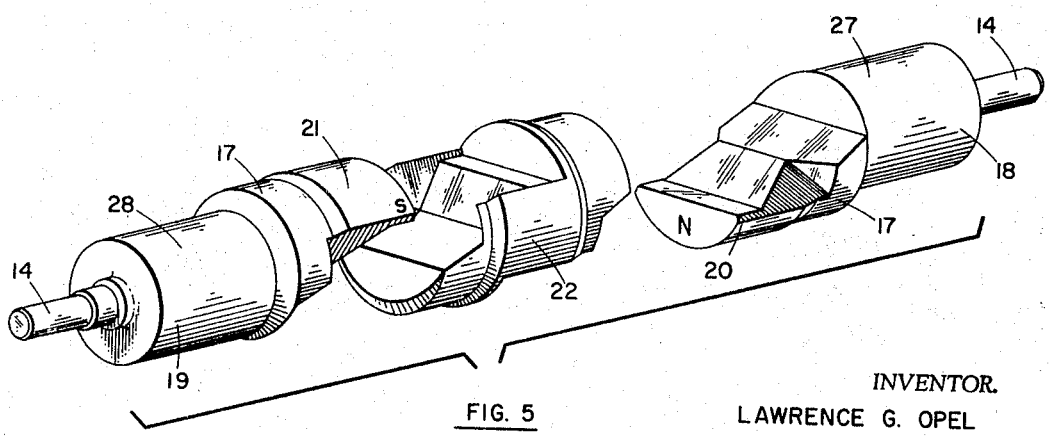
FIG. 5 is an exploded perspective view of the two-pole rotor of the machine of FIG. 4.

A three-phase, two-pole, 1 kw. generator, designed in accordance with the present invention as shown in FIGS. 4 and 5 for 24,000 r.p.m. and 400 cycle output, was constructed using 4140 steel alloy for the rotor magnetic material and Inconel X for the non-magnetic rotor material with the parts furnace brazed together to form a solid rotor. Because of the unique features of the present invention it was possible to keep the rotor diameter to only 1⅞", thus reducing the rotational stresses to levels well within the capability of the rotor materials for the design rotational speed of 24,000 r.p.m. The poles and frame were made from low carbon steel with anodized aluminum wire utilized for the stator generating conductors.

Test results for 24,000 r.p.m. operation verified the design calculations with a windage loss of only 1½% and negligible pole face loss. Due to the high coercive force of the rotor steel, the generator had a high residual voltage (25% of rated voltage), thus assuring positive build up of voltage upon start-up.

Because of its high allowable rotational design speeds, a generator built in accordance with the present invention is particularly suited for being directly driven from a high speed prime mover such as a turbine or by means of a diesel engine through step-up gearing. A typical preferred 150 kw., 2 pole, 3 phase, 24,000 r.p.m., 450 volt generator with simultaneous 400 cycle and 60 cycle output constructed in accordance with the present invention has a rotor with its magnetic sections of AISI 4130 steel and a non-magnetic yoke section of Inconel X brazed together with a gold/nickel braze alloy. The rotor diameter at its enlarged center pole portion is no larger than approximately 6 inches for a generator of this capacity. The stator is fabricated of 3% silicon steel laminations, while the housing is of a low carbon steel such as AISI type C1015 or equivalent. Cooling may be either by forced air convection, as by means of a fan driven by the rotor shaft, or by a liquid cooling system utilizing a housing having suitable conduits or consisting of a double steel structure. Rotor cooling is not required in the instant invention since the losses occurring in the rotor and any consequent heating are negligible.

A unique feature of a generator in accordance with the present invention is that it is short circuit stable, i.e., a short circuit does not demagnetize the D.C. excitation magnetic circuit, and consequently it will restart after removal of a short circuit load.

In addition to being utilized in a generator, the features of the present invention may also be applied to a motor application which will operate as a synchronous motor. The non-magnetic conducting material of the rotor performs as rotor bars, in effect forming a squirrel-cage winding to produce self-starting torque, as in an induction motor.

While the rotor central yoke section has been indicated as preferably being of a non-magnetic metal, it may also be formed of other non-magnetic materials such as plastics, ceramics and the like. The yoke section may also be formed with isolating air gaps between the salient poles thus further reducing the rotor weight and manufacturing costs.

The losses of a generator in accordance with the present invention are significantly less than those of either an Inductor, Lundell or Inductor-Lundell-type generator. For instance, in an Inductor machine the stator conductor losses are greater because the length of the conductor is increased over that of the present invention by the axial length of one stator section and the distance between the stator sections. This length of conductor produces no voltage. The stator iron loss of the Inductor generator is greater as the double stator increases the amount of stator iron to approximately twice that required for the present invention for an equivalent design. The rotor eddy current losses in the Inductor generator are greater because of the flux transition from static to rotational on the rotor pole surface and the variable reluctance between stator and rotor. The eddy current loss in the rotor pole face is also greater in the Inductor machine as the pole face material volume is approximately twice as great. The windage loss of the present machine is much less than the Inductor since the latter has twice the stator length and therefore has a greater length rotor section at its largest diameter and since the Inductor rotor has poles projecting at each stator location which produce air movement and turbulence. The rotor of the invention is smooth, thereby resulting in a minimum of turbulence and windage loss. Thus, the overall efficiency of the present generator is considerably higher than that of the Inductor generator.

In the Lundell generator leakage flux in the rotor is greater than in that of the present generator due to the close spacing of the north and south axial sections of the Lundell and the greater permeance between opposite rotor poles at the ends of the stator. The rotor cannot be made solid due to the field coil location, therefore its speed is limited to less than the present generator design for the same rotor diameter and rotor stress. The hollow rotor with rotating gaps at each end also produces a higher windage loss. The excitation loss is also greater due to the double concentric field pole air gaps at each end and the limited space for the coil. A further limitation of the Lundell eliminated by the present invention is in the concentric field coil location within the rotor ends. This location limits both the rotor and field coil design and introduces a problem of field coil support. The efficiency of the Lundell generator is primarily lower than the generator of the present invention by the higher windage and excitation losses.

In the Inductor-Lundell, the generator stator section is at a positive magnetic potential relative to the housing and it is necessary to magnetically insulate the stator from the housing to reduce the amount of the axial flux flowing in the stator which produces no useful voltage. Because of the necessity for such magnetic insulation, an Inductor-Lundell machine is, of necessity, larger and heavier than the present machine. Furthermore, in the Inductor-Lundell, the field coil is located externally of the stator iron. This large diameter field coil results in greater excitation loss than occurs in the present invention.

While a machine built in accordance with the present invention thus exhibits superior efficiency to prior art machines, one of the prime advantages resulting therefrom is the reduction in size with its concomitant characteristics of exceptionally high speed operation as well as reduced weight. Such machines not only are of significant advantage in high temperature aerospace applications but lend themselves to power generation in conjunction with directly coupled high speed gas or steam turbines.

While a particular embodiment of this invention has been illustrated and described herein, it will be apparent that various changes and modifications may be made in the construction and arrangement of the various parts without departing from the spirit and scope of this invention in its broader aspects or as defined in the following claims.

I claim:
1. A dynamo-electric machine comprising a stator element, a plurality of stationary field poles, an external magnetic flux return connection between said stator element and said field poles, and a salient pole rotor for said machine comprising a solid body of revolution providing an internal excitation flux path between each of said field poles and said stator element, said rotor being substantially free from magnetic attraction in an axial direction, to either of said field poles or said stator element.

2. A dynamo-electric machine comprising a pair of colinear annular field poles; a stator element located between said poles and in axial alignment therewith; a magnetic housing in direct contact with and interconnecting the outermost peripheries of the central stator element and the pair of field poles; a magnetic rotor comprising a solid body of revolution having a plurality of salient poles opposite said stator of alternate polarity around the periphery of the rotor and having a pole of opposite polarity at each end of the rotor; a first magnetic connection between all salient poles of one polarity and the rotor one end pole; a second magnetic connection between all salient poles of the opposite polarity and the rotor other end pole, a portion of said first magnetic connection being interlinked with a portion of said second magnetic connection to provide two magnetic paths for the field of each of said field poles, one of said paths being exclusive of the other end of said rotor and means associated with said field poles for producing a uni-directional flux through said rotor.

3. A dynamo-electric machine as set forth in claim 2, wherein is provided a closed magnetic path for field excitation which path is unvarying in air gap reluctance around the circumference of the rotor, between said field poles and said rotor, wherein each of said rotor end poles is of constant annular cross-section located concentrically within an annular field pole with a substantially constant air gap therebetween having a substantially constant magnetic reluctance thereacross.

4. A dynamo-electric machine as set forth in claim 2, wherein the radial air gap between said rotor salient poles and the stator and the radial air gap between the annular field poles and the annular rotor end poles are of substantially constant width around the circumference of the rotor, whereby said machine has a substantially constant magnetic reluctance.

5. In a dynamo-electric machine, a solid metal rotor having no voids or cavities therein comprising a smooth surfaced body of revolution and having two magnetic metal end sections separated by a non-magnetic metal central section, each of said magnetic sections having a plurality of raised salient pole sections structurally and magnetically connected to a cylindrical end pole, the salient pole sections of one of said magnetic sections being of one polarity and the salient pole sections of the other of said magnetic sections being of another polarity, said salient pole sections being interleaved circumferentially around the rotor and magnetically isolated by and metallurgically bonded to said central section to provide an integral composite rotor with salient poles of alternate polarity around the circumference of the central portion of said rotor, said raised salient pole sections having cylindrical segmental pole faces with an axial length substantially the same as the axial width of the stator yoke section with which it is to be operatively associated.

References Cited by the Examiner

UNITED STATES PATENTS

| | | | |
|---|---|---|---|
| 588,602 | 8/1897 | Rice | 310—168 |
| 1,304,229 | 5/1919 | Wiard | 310—64 |
| 2,340,312 | 2/1944 | Drake | 310—64 |
| 3,223,866 | 12/1965 | Tiltins | 310—168 |

FOREIGN PATENTS

| | | |
|---|---|---|
| 969,914 | 7/1961 | Great Britain. |
| 1,121,716 | 1/1962 | Germany. |

MILTON O. HIRSHFIELD, *Primary Examiner.*

MAX L. LEVY, *Examiner.*

L. L. SMITH, *Assistant Examiner.*